Feb. 6, 1940. W. STEINBAUER ET AL 2,189,353
POWER-TRANSMISSION SYSTEM FOR ELECTRICALLY DRIVEN TRAINS
Filed Dec. 22, 1937 6 Sheets-Sheet 1

WITNESSES:

INVENTORS.
Wolfgang Steinbauer,
Hans Kother and Paul Müller.
BY
ATTORNEY

Feb. 6, 1940. W. STEINBAUER ET AL 2,189,353
POWER-TRANSMISSION SYSTEM FOR ELECTRICALLY DRIVEN TRAINS
Filed Dec. 22, 1937 6 Sheets-Sheet 4

INVENTORS
Wolfgang Steinbauer,
Hans Kother & Paul Müller.
BY
W R Coley
ATTORNEY

Patented Feb. 6, 1940

2,189,353

UNITED STATES PATENT OFFICE 2,189,353

POWER-TRANSMISSION SYSTEM FOR ELECTRICALLY DRIVEN TRAINS

Wolfgang Steinbauer, Berlin, Hans Kother, Berlin-Siemensstadt, and Paul Müller, Berlin-Schoneberg, Germany, assignors to Westinghouse Electric & Manufacturing Company, East Pittsburgh, Pa., a corporation of Pennsylvania Application December 22, 1937, Serial No. 181,150
In Germany December 23, 1936

6 Claims. (Cl. 290—3)

The running speeds of railroad trains are continually being increased. The operating experience obtained with steam locomotives—of the conventional type that have been in use up to the present time—which were built for very high running speeds indicates, however, that such locomotives are subjected to considerable wear, mainly due to the action of the piston-drive arrangement of these locomotives.

The present invention covers a system of electric power-transmission for trains and has for its object the complete elimination of the disadvantages of the steam locomotives just referred to at the higher speeds, and which, as a consequence hereof, will make it possible to increase considerably the driving power, the running speed, and the acceleration.

Figure 1:
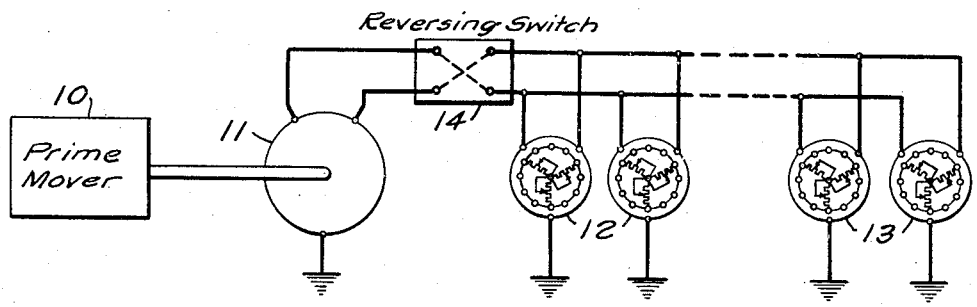
Figure 2:
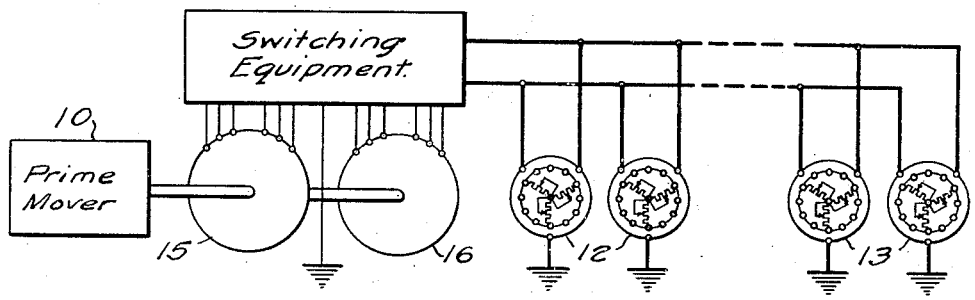
Figure 3:
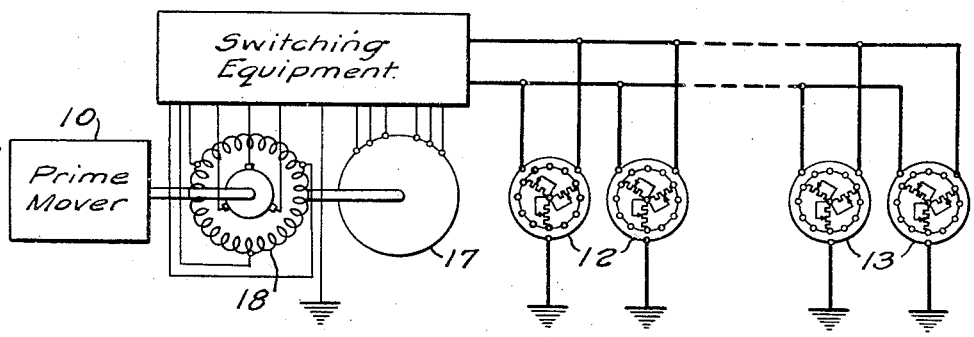

In line with the invention as shown in the accompanying drawings in which Figures 1, 2 and 3 are diagrammatic views showing in general different embodiments of the invention and Figs. 4 to 14 show the invention in more detail, the locomotive is equipped with a thermally operating prime mover 10 whose output is considerably higher than the power required to drive the axles of the locomotive, and with this thermally operating prime mover is coupled an electric generator 11 (polyphase generator) which supplies power to the traction motors 12 of the locomotive as well as to other traction motors 13 that are mounted on the railroad cars pulled by the locomotive. The latter motors can be mounted on the axles of the cars of the train in the usual manner, for instance: by the nose-suspension method. A train of this kind is operated by supplying the generated current, more specifically: the generated polyphase current to the traction motors installed on the locomotive as well as to those installed on the cars pulled by the locomotive. It is advisable to provide the thermally operating prime movers installed on the locomotive in the form of turbines, because, due to the high rotational speed, the dimensions of the prime movers as well as those of the generators will then be small. It is further recommended to provide a turbine installation of the condensing type, because the operation of such an installation is highly economical. The steam can be produced in high-power boilers at a high pressure.

It is especially advantageous to build the traction motors in the form of deep bar or double deck squirrel cage motors, because it is no longer necessary to control the rotor circuits when motors of either one of these types are used. Application of deep bar or double deck squirrel cage motors further facilitates the application of a method of pole changing; moreover, it makes it possible to apply a simple method of electrical braking on the eddy current principle, a method which consists in energizing the stator windings of the motors with direct current.

In those cases where the differences in diameter of the driving wheels can be relatively large, it may be advisable, depending on the prevailing conditions, to insert resistors into the rotor circuits of the motors. Eventually these resistors can be mounted inside of the rotor structure, and it is advisable to make them adjustable, because it is then possible to re-adjust their resistance values when the diameters of the driving wheels change, due to wear.

In applying the new system, it is especially advantageous to transmit the power by means of polyphase currents (three-phase current) and to use traction motors of the squirrel cage type. In fact, the dimensions of the electric machines can be kept at very small values when three-phase current is going to be used. If the power is transmitted by means of polyphase currents, the use of a frequency higher than the frequency usually employed for power-distribution systems will be quite advantageous. For instance, frequencies of from 100 to 150 cy./sec., and still higher can be used to advantage. The transmission of the electric power from the generator to the traction motors can be considerably simplified by using only two main conductive buses from one end of the train to the other, for the third conductive path for the current can be constituted by the wheels of the locomotive, the rails, the driving wheels of the cars that are equipped with traction motors, and the frames of these motors. It is a very great advantage of the power-transmission system in line with the invention that it permits the use of voltages that are higher than those customary in connection with other traction systems.

It is advantageous to control the various traction motors located on the railroad cars, which are electrically coupled to and receive power from the locomotive, from one central point located on the locomotive. The direction of rotation of those motors can be reversed by simply interchanging two phases, as by a reversing switch 14, no reversing switches being required for the individual motors in this particular case. As stated before, it is especially advantageous to equip the motors with deep bar or double deck squirrel cage rotors. For the motors will have a higher starting torque when rotors of either one of these types are used; moreover, they can operate at higher slip values in this case, and all motors will supply to the axles essentially the same amount of power even when there are noticeable differences in their rotational speeds.

Other pole numbers (which must always be even) can be obtained when the arrangement of the stator winding is similar to that of a direct current armature winding and when the winding has suitable taps; in this case the connections can be changed in the desired manner by means of a pole-changing switch. It is then necessary that the same change in pole number be made simultaneously in the rotor, and this requires a great number of collector rings. Eventually the latter necessity can be avoided by providing a rotor that is equipped with a simple squirrel cage winding; in this case the field must be energized by means of the stator winding, and the energizing current required for this purpose must then be produced by means of capacitors, independently rotating phase advancers (A. C.-exciters), or similar apparatus.

The motors can be started and their speed controlled by controlling the frequency on the locomotive. As shown in Fig. 2, one method consists in employing two or more induction generators 15 and 16 having different pole numbers. These generators can be operated individually as well as by the straight or by the differential cascade method. If, for instance, two of such generators operate individually at the frequencies $f_1$ and $f_2$, they can operate in cascade at the frequencies $f_1+f_2$ and $f_1-f_2$. This means that if the two generators are designed to generate currents respectively at 40 and at 60 cy./sec., they can be used, by properly connecting them, to generate currents at 20, 40, 60 and 100 cy./sec. for driving the traction motors.

Figure 4:
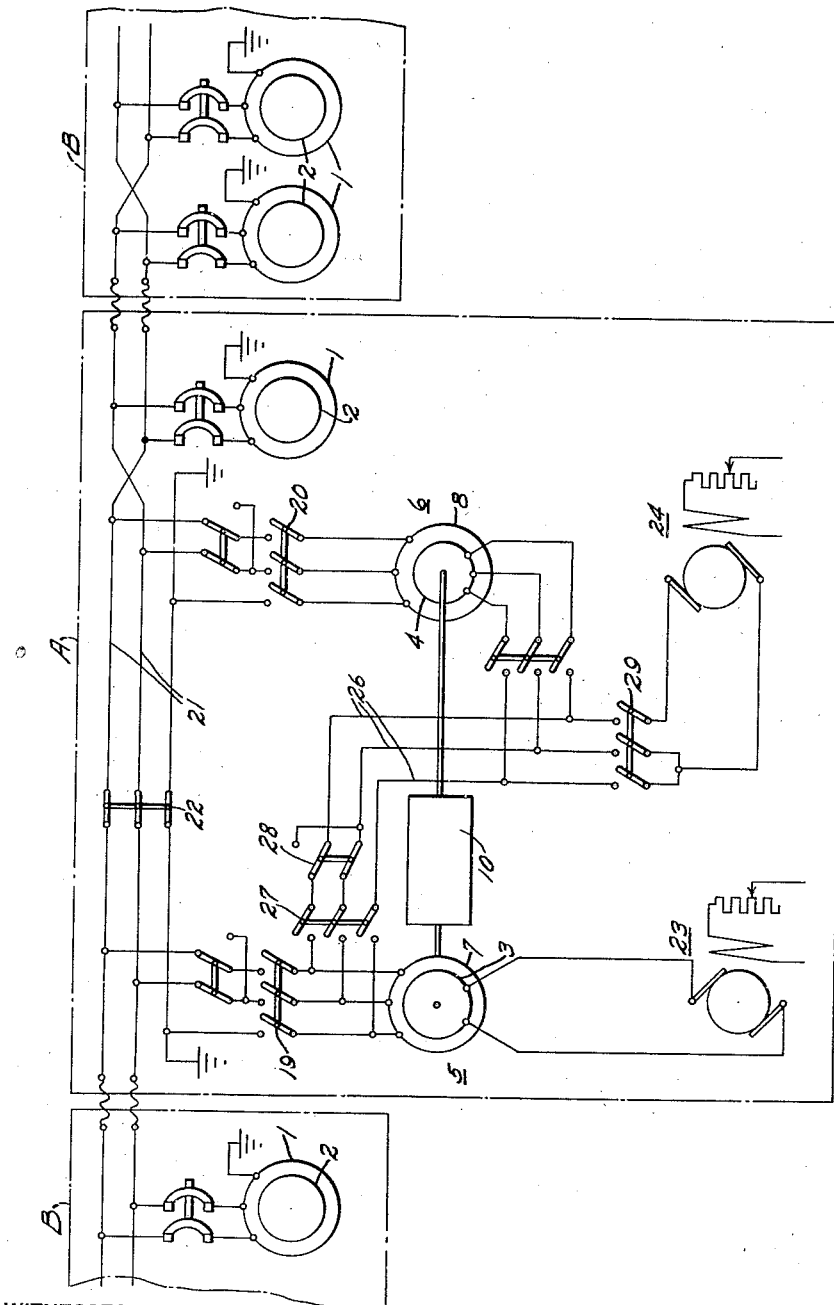

Fig. 4 shows a circuit with two generators which may be operated separately or in cascade. In Fig. 4, A designates the locomotive which, at the same time, is designed to be the power plant for the other cars of the train.

B are cars, placed to both sides of the locomotive and coupled to the locomotive. The electric motors 1 driving the cars B are supplied with current from the generators on the locomotive. The motors 1 are designed as A. C. asynchronous motors and are provided with a squirrel cage rotor 2 (double bar rotor or eddy current rotor). Power is supplied to motors of the train by means of two conductors passing through the train, as well as by the rails.

10 is a steam turbine placed in the locomotive. The turbine 10 drives the rotors 3 and 4 of two generators 5 and 6. The generators 5 and 6 are so designed that they may be used as synchronous machines for generating currents of two different frequencies, for instance, 40 cycles and 60 cycles.

7 and 8 are the stators of the generators 5 and 6, and they may be connected, by means of the switches 19 and 20 to the conductors 21, to which the driving motors of the locomotive A and the cars B are also connected. A disconnecting switch 22 is placed in the conductor 21 of the locomotive, which makes it possible to supply current from the generators to the individual parts of the train independently of the other parts.

23 and 24 are the two exciters, the first of which is connected to the generator 5, the second, to generator 6. The circuit is designed in such a way that generator 5 may be connected in cascade with generator 6. For this purpose, the rotor 4 of generator 6 has a three phase winding. For the cascade connection, a group of connecting conductors 26 is provided, and the disconnecting switch 27 is placed in this group. Besides this, a reversing switch 28 is also inserted in this group of conductors to permit a phase interchange. The conductors 26 are connected on the one side to the terminals of the stator 7 of the generator 5, and on the other side to the slip ring brushes of stator 4 of generator 6. If machine 6 is to be operated as a synchronous generator, switch 27 is opened, and the exciter 24 is connected with the rotor windings of generator 6 through the switch 29. It will be readily understood that this circuit makes it possible to supply power to the motors either from the generator 5, or the generator 6, or from both generators connected in cascade. Furthermore, the phase connections of the machines in cascade may be selected so that the current supplied to the motors may have a frequency equal to the difference in frequency of the two generators, or it may have a frequency equal to the sum of the frequencies of the generators.

The principle of the circuit shown in Fig. 4 may be retained, if the generators 5 and 6 are pure asynchronous machines and have slip regulation.

If the cascade method is being employed, the new excitation can be applied through resistors during the transition period already before the old excitation has been disconnected. If this procedure is followed, the excitation already present can be weakened in steps while the new excitation is being strengthened gradually; this particular method is especially advantageous if it is desired to obtain a perfectly smooth transition.

Figure 5:
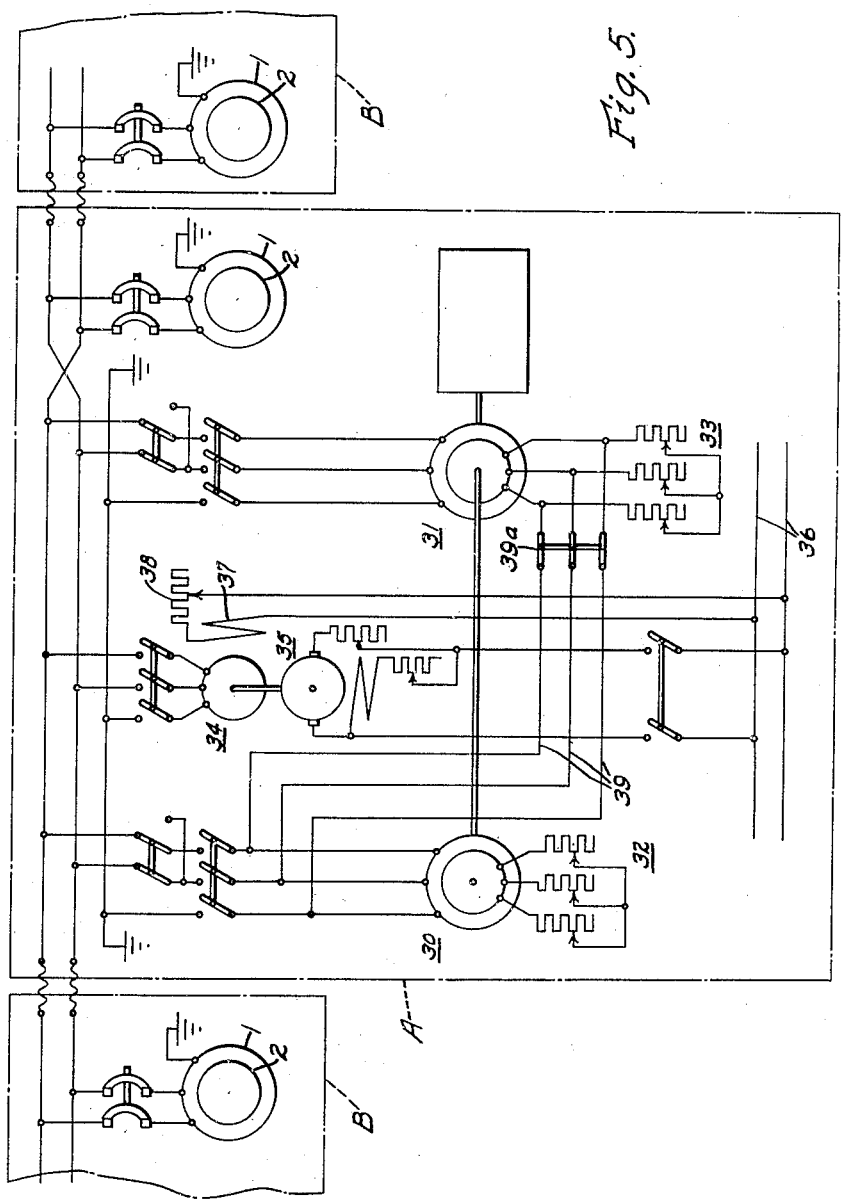

Fig. 5 shows the principle of the circuit for the case where there are two asynchronous generators with stator excitation and slip regulation. This circuit differs fundamentally from that shown in Fig. 4, in that the generators 30 and 31 are provided with polyphase slip ring rotors. The slip regulator resistance 32 and 33 are attached to the slip rings. Excitation for the generator set is provided by the synchronous generator 34, which is driven by a variable speed D. C. motor 35. The direct current motor 35 receives its energy from the bus bars 36. The synchronous generator 34 is excited by a field winding 37 which is also connected to the bus bars 36 through a regulator 38. 39 designates leads connecting with a switch 39a which makes it possible to connect in cascade.

Figure 6:
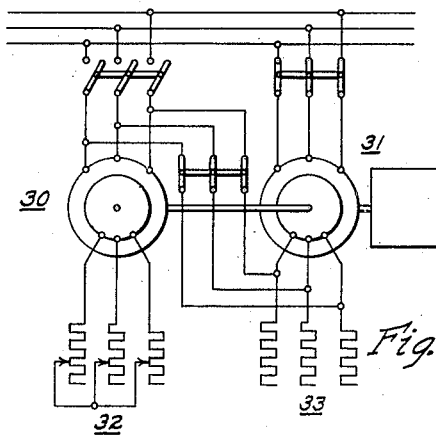

Figs. 6 to 10 show various circuits which are used when operating on different frequencies. Fig. 6 shows the circuit when the two generators 30 and 31 are connected in cascade in such a manner that the resulting frequency is equal to the difference between the frequencies of the two generators. By changing the rotor resistances 32 of the generator 30, the resulting frequency may be varied from zero to twenty. In this circuit, the rotor field of generator 31 moves in a direction opposite to the direction of motion of the generator.

Figure 7:
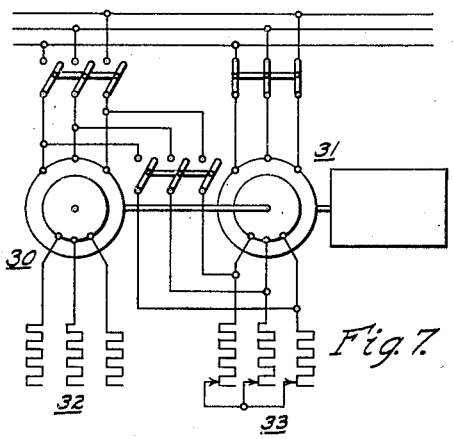
Figure 8:
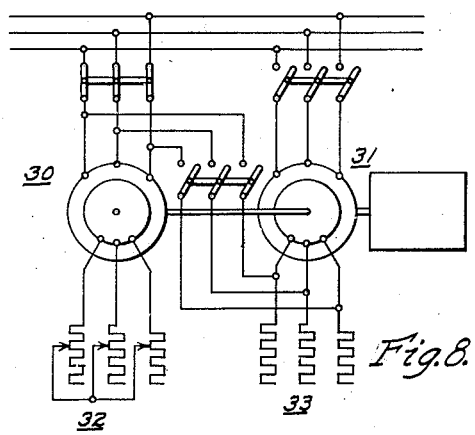

If it is desired to change over to a higher frequency, changes will be made as in Fig. 7. First, the rotor resistances 33 of generator 31 will be placed in the circuit, so that generator 31 will supply the current. The generator 30 is then disconnected. Now a resistance will be placed in the rotor circuit of generator 30 (compare Fig. 8), and generator 30 will again be connected with the bus bars 22. By gradually reducing the resistance 32 in the rotor circuit of generator 30, the frequency will be raised from 20 to 40 cycles. Generator 31 is disconnected.

Figure 9:
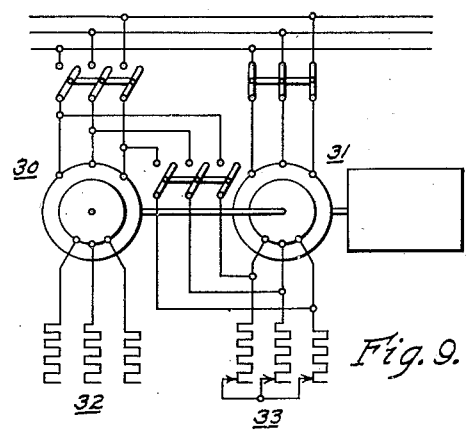

If it is desired to increase the frequency still more, the change to the third step will be started by placing a resistance 33 in the rotor circuit of generator 31 (compare Fig. 9). Generator 31 now carries the load, and generator 30 can be disconnected. By reducing the resistance 33, the frequency will be increased gradually until it becomes equal to the synchronous frequency of generator 31.

Figure 10:
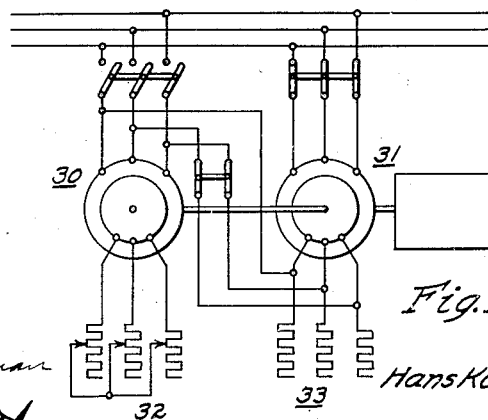

By passing over into the fourth cascade step, the stator of generator 30 will be connected to the rotor of generator 31 in such a way that the field of the rotor turns in the same direction as the mechanical motion (see Fig. 10). The resistance 32 of generator 30 is connected in the circuit. After connecting in cascade, resistance 33 of generator 31 is cut out of the circuit. Finally, resistance 32 of generator 30 is also switched out of the circuit. The frequency will rise gradually to a value corresponding to the sum of the synchronous frequencies of the two generators.

The frequency can be controlled in a very advantageous manner by using commutator machines, as shown in Fig. 3. The equipment to be provided in this case can consist of an ordinary induction generator 17 and a commutator generator 18. The commutator generator should be designed for one-third of the total output and for one-third of the maximum frequency, while the induction generator, which must be equipped with collector rings, should be designed for two-thirds of the total output. Both generators are mechanically coupled with the prime mover. When the train must be accelerated from standstill, only the commutator generator is used during the first portion of the acceleration period, and by means of this machine the frequency is gradually increased up to about one-third of the maximum frequency. Thereupon the commutator generator is connected to the collector rings of the induction generator and used as a concatenated auxiliary or regulating machine by gradually changing the voltage and the frequency generated by this machine from the maximum positive values to the vanishing points and subsequently to the maximum negative values. If the machines are operated in this manner, the induction machine at first will operate above synchronism relatively to the flux that is set up by the regulating machine; thereupon the induction machine will pass through synchronism—at this point the current generated by the commutator generator has the frequency zero and has become, therefore, a direct current—and subsequently the induction machine will operate below synchronism until the rotational speed of the flux in this machine is about 50% higher than the absolute speed of the shaft. The stator winding of the induction generator will then produce frequencies that cover a range from a certain maximum value down to one-third of this maximum value.

Figure 11:
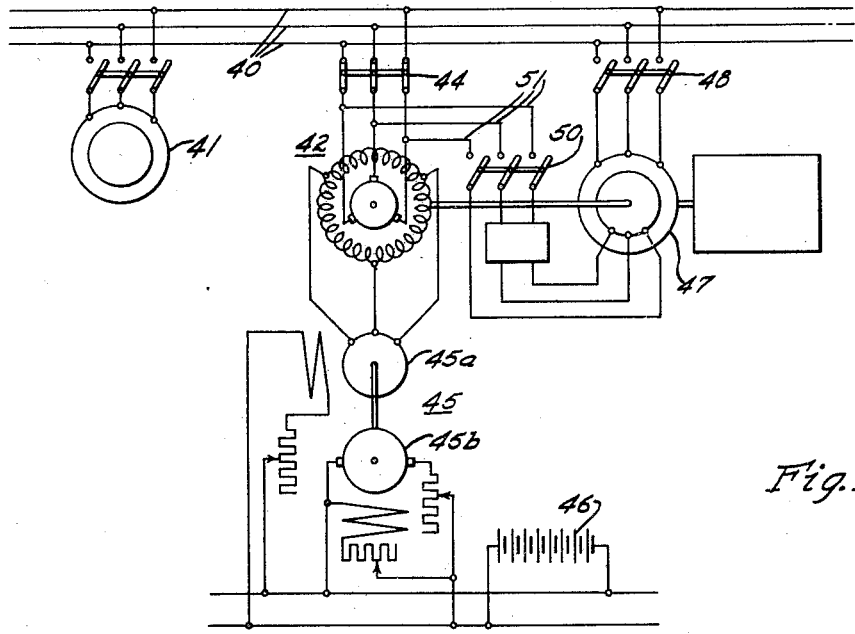

Fig. 11 represents a circuit comprising an asynchronous generator and a commutator generator. 40 designates the bus bars, to which are connected the driving motors 41 of the locomotive and of the cars of the train. 42 is the externally excited commutator generator. The generator may be connected to the bus bars 40 by means of the switch 44. By changing the frequency of the current supplied to the exciter winding, it is possible to obtain a change of the generator frequency, for instance, between zero and 40 cycles. The variable frequency exciter current is provided by the "exciter converter" 45, consisting of a synchronous generator 45a, and a direct current motor 45b which is supplied with current from a storage battery 46. 47 is an asynchronous generator, the rotor of which is provided with a slip ring winding. The generator 47 may be connected with the bus bars 40 by means of the switch 48. The generator 47 is so designed that its synchronous frequency is equal to two times the maximum frequency of the commutator generator 42. For low speeds and frequencies, the commutator generator 42 alone is used for supplying energy to the motors. The switch 44 is closed. If the motors are to receive current of a higher frequency than the maximum of the collector generator, this generator will be connected to the slip rings of the asynchronous generator 47 through the switch 50 and the conductors 51, so that the rotor field of the generator 47 will turn in a sense contrary to the rotor. If the synchronous frequency of generator 47 is eighty and the maximum frequency of generator 42 is forty, at corresponding speeds, then generator 47 will also feed current at a frequency of forty cycles into the circuit, in this case. Switch 44 may now be opened, and the frequency of generator 42 will be gradually reduced. The frequency of the generator 47 will, at the same time, gradually increase to a value equal to the synchronous frequency.

If, now, either the direction of rotation of the "exciter converter" is reversed, or a phase reversal between the commutator generator 42 and the slip rings of the asynchronous generator 47 is produced, and the frequency of the commutator generator 42 is again gradually increased, the field produced in the rotor of generator 47 turns in the same direction as the mechanical movement of the rotor of generator 47. The frequency of the current produced by the asynchronous generator will rise, with the further increase of the frequency of the commutator generator, to a value which will finally correspond to the sum of the frequencies of the commutator generator 42 and the asynchronous generator 47.

A compounding effect, i. e., an automatic lowering of the running speed of the train when the load increases, can be obtained by the following method disclosed in this invention. The current supplied by the main generator to the traction motors flows through a current transformer, and the secondary current of this transformer after having been rectified, is led through an additional field winding of the driving motor of the motor-generator set. The speed and thus the frequency of this set will then change depending on the load in a sense which will result in a reduction of the load carried by the equipment. It is equally well possible, however, to send the current supplied by the current transformer, after it has been rectified, through an anti-compounding winding of the auxiliary generator which supplies the current for driving the motor of the set.

Figure 12:
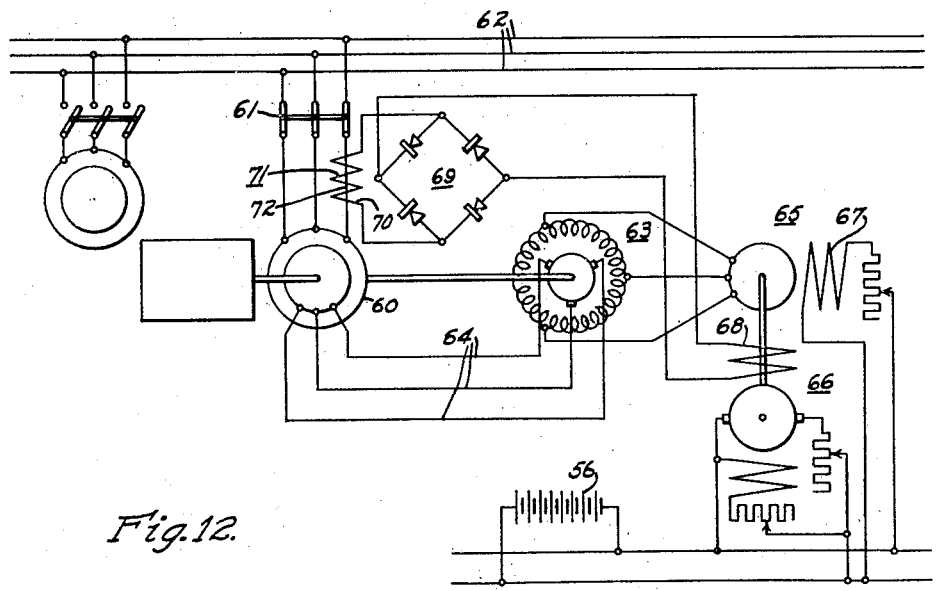

Fig. 12 of the drawings shows schematically an arrangement of an asynchronous generator which is excited by a commutator generator and which is provided with a compounding circuit. 60, in this figure, designates an asynchronous generator which supplies current through the switch 61 to the bus bars 62, to which are connected the driving motors of the locomotive and the cars. The asynchronous generator 60 is excited by an externally excited commutator generator 63 whose brushes are connected to the slip rings of the rotor of the asynchronous generator 60 by the conductors 64. The exciter winding of the commutator generator 63 is energized by a synchronous generator 65 which is driven by a variable speed direct current motor 66. This motor, whose field can be varied, can, for instance, be connected with a storage battery 56. 67 is the field coil of the synchronous generator 65, which is also energized by the storage battery 56. To obtain an automatic reduction of the velocity of the train with increasing load, a compound winding 68 is provided on the motor 66 which drives the synchronous generator 65 energizing the commutator generator 63. This compound winding 68 is connected with the secondary winding 70 of a current transformer 71, through a rectifier group 69 arranged in a Graetz circuit. The primary winding 72 of the current transformer 71 is set into the generator bus bar circuit. As a result of this arrangement, the field of the motor 66 for the synchronous generator 65 is strengthened as the current increases, so that the R. P. M. of the motor 66, and thereby the frequency, is reduced in the sense of a lowering of the load on the generator and motor.

The voltage supplied by the main generator to the traction motors should be approximately proportional to the frequency, because the motors will then operate under favorable conditions. For the reactive voltage component increases directly with the frequency, while the watt-component of the voltage, which also depends on the rotational speed, increases at the same time and at the same rate.

If it is desired to operate the traction motors at the highest possible efficiency and power factor even when the load varies, provisions should be made that the voltage, instead of being held constant at a given value of the frequency, can be readjusted in magnitude depending on the prevailing load conditions, the best and simplest method of doing this consists in so changing the voltage that its magnitude will remain about proportional to the current absorbed by the traction motors. Consequently, it will be advisable to give the voltage a magnitude that is proportional to the product of frequency and traction motor current. The particular arrangement of the connection diagram which will make it possible to satisfy this condition depends entirely on the system chosen. In the case of an ordinary synchronous or induction generator, a constant flux and a varying speed will produce automatically a voltage that is proportional to the frequency. It is merely necessary, therefore, to give the direct current used for exciting the machine (i. e., the main generator, or the auxiliary machine that is concatenated with the latter) a magnitude that is about proportional to the current absorbed by the traction motors. This can be done by leading the traction current through a current transformer, rectifying the secondary current of this transformer, and leading this rectified current through a winding on the field of the main machine. Furthermore, an additional, and eventually adjustable, excitation of small magnitude must be provided for initiating the building up of the field.

Figure 13:
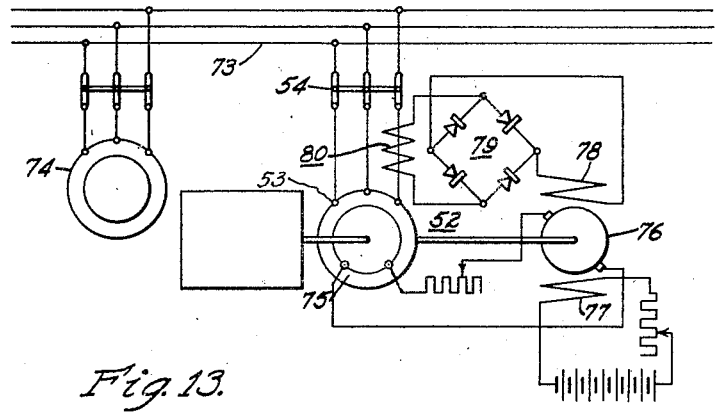

Fig. 13 shows a circuit with a synchronous generator, in which the voltage is proportional to the product of frequency and operating current. 52 is the synchronous generator, the stator 53 of which may be connected by the switch 54 to the bus bars 73, to which is also connected the driving motor 74. The direct current excitation of the rotor 75 of the synchronous generator is supplied by a direct current exciter 76 which operates at the same R. P. M. as the rotor 75.

77 is the direct current exciter winding which makes it possible to obtain a constant adjustable field. Depending on the R. P. M. of the generator, the voltage of the system as well as the frequency must vary proportionally to the R. P. M. In addition there will also be established a dependent relation to the operating current, if the exciter 76 is provided with an auxiliary field winding 78, which is energized by the secondary of a current transformer 80 through the rectifier 79 arranged as a Graetz circuit. The pimary of the current transformer 80 is placed in the circuit energizing the generator 53. It follows as a result of this arrangement, that the excitation, and therefore also the voltage of generator 52, is practically proportional to the product of frequency and operating current.

If the voltage to be supplied to the field winding is generated by a special motor-generator set (this case has already been referred to in the foregoing) which consists of an adjustable-speed direct current motor coupled with a synchronous generator, the field current to be supplied to the field winding of the latter generator must be kept proportional to the speed of this set in order to meet the requirement just stated. This means that another small direct current machine having constant excitation must be coupled with the motor-generator set. Since the speed of this set is proportional to the frequency (it should be remembered that this speed determines the frequency of the entire system), the voltage produced by the small direct current generator will be proportional to the frequency, and, accordingly, the excitation current supplied by this generator to the field winding of the synchronous generator of the motor-generator set will also be proportional to the frequency. And, since the three-phase voltage produced by this synchronous generator is proportional to its flux and also to the frequency, this voltage will actually be proportional to the square of the frequency. The requirement was, however, that the voltage to be supplied to the traction motors be approximately proportional not merely to the frequency, but also to the traction motor current. This means that the field current of the small direct current generator which has subsequently been added to the motor-generator set, instead of being held constant should be made proportional to the traction motor current. In order to accomplish this, the traction motor current must again be led through a small current transformer and the secondary current of the latter, after being rectified, must be supplied to the field winding of the direct current generator. In addition, current must be supplied to this field winding by another source, for instance, by the light battery, in order to initiate the generation of the voltage to be supplied by this machine, and further in order to keep this voltage stable and to make it possible to control this voltage in any desired manner.

Figure 14:
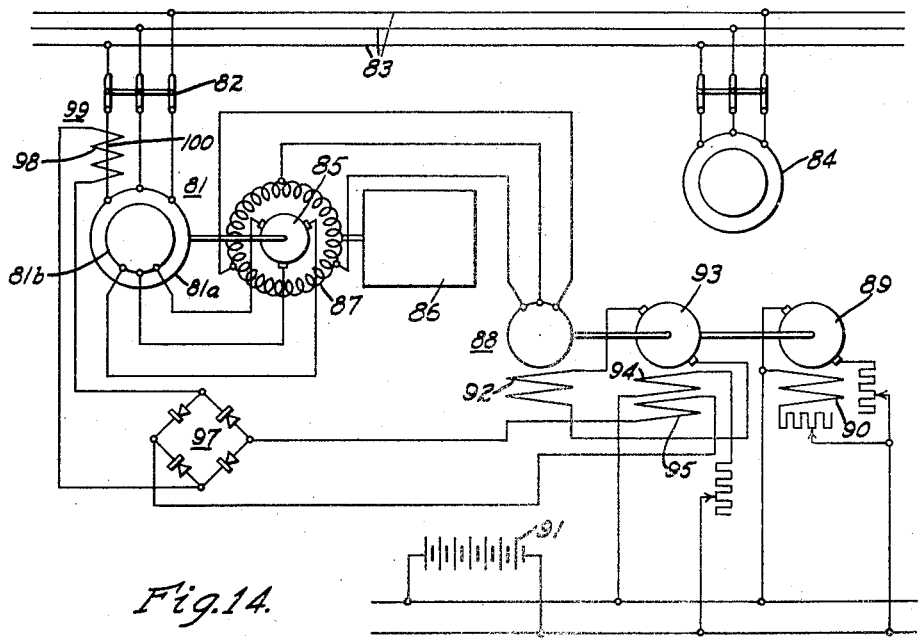

Fig. 14 shows a circuit containing an asynchronous generator excited by a commutator generator, in which the excitation is affected, so that the voltage of the commutator generator is proportional to the product of frequency and operating current. 81 is the asynchronous generator whose stator 81a is connected, through the switch 82, to the bus bars 83, with which are also connected the driving motors 84 on the locomotive and on the cars of the train. The slip rings of the rotor 81b of the asynchronous generator are connected with the brushes of a commutator generator 85, which is driven by the turbine 86, which also drives the generator 81. The exciter winding 87 of the commutator generator is energized by a synchronous auxiliary exciter 88, which may be driven at variable speeds by the adjustable driving motor 89. The motor 89, whose field winding 90 carries a current which may be regulated, is driven from the storage battery 91. For exciting the synchronous generator 88, a field winding 92 is provided which is connected to another auxiliary exciter 93. The original excitation of the auxiliary exciter 93 is provided by the field winding 94, which is energized from an external source of current, for instance, the storage battery 91. Besides this, the auxiliary exciter 93 is provided with a further exciter winding 95 which is connected to the secondary 98 of a current transformer 99 through a group of rectifiers 97 arranged in a Graetz circuit. The primary winding 100 of the current transformer is placed in the load current circuit of the generator 81. By this arrangement we also obtain a condition in which the excitation, and therefore the voltage of the asynchronous generator 81 is proportional to the product of frequency and operating current.

The outfit described in the foregoing can be operated—independently of the types of the machines in question—in the following manner.

In order to start the train, the operator brings the master controller in the position corresponding to the lowest value of the frequency, applies the fundamental excitation to the machines, and closes the main breaker. The traction motors will then absorb a relatively low starting current. The current can then be increased by putting the master controller in a position corresponding to a higher frequency. The operator leaves the master controller in the position reached as soon as the running speed of the train has reached the desired value. If it is desired to reduce the running speed, the master controller must be turned backward onto a lower speed step; as a consequence hereof, the frequency of the voltage produced by the generators will drop, and the traction motors will absorb a lower current as long as their speeds do not drop, it is even possible that the motors will start to regenerate and thus produce a braking effect. This clearly indicates that the control method is very simple. The train will accelerate if the master controller is notched upward, and braking will occur if the master controller is notched downward. This leads to a method of operating the train that is different in many respects from that to be followed when traction motors of the ordinary series type are used. The operator should not just return the master controller to the zero position while the train is running because in this case braking and deceleration of the train would be the immediate result. And if for special reasons, for instance, because of a functioning of one of the protective devices, it should become necessary to return the master controller to the zero position, great care should be taken if thereafter the controller handle is again moved away from that position. For in this case it is necessary to match first the frequency corresponding to the speed at which the traction motors are running at that instant. The proper thing to do after the frequency has been adjusted is to close first the main breaker, thereupon the excitation can be increased. If it is desired to cut off the tractive effort while the train is running, the operator should return into the zero position not the speed drum of the master controller, but the auxiliary drum that is used for controlling the excitation. After the excitation has thus been weakened, the main breaker can be tripped.

The resistance in ohms which the resistor should have in order to prevent a reversal of the current in the main generator depends on the arrangement of the connections and on the amount of regenerated power. If the method of keeping the voltage applied to the traction motors approximately proportional to the motor current—the method recommended in the foregoing as being the most suitable one for motoring—is also adhered to when the motors are regenerating, the braking torque or the retarding force at the flanges of the wheels will be proportional to the product of voltage and current if it is assumed that the running speed remains approximately constant. Hence the resistance in ohms of the braking resistor (voltage divided by current) must also be a constant, regardless of the magnitude of the braking force. But if the running speed changes, the resistance in ohms must be increased or decreased in the same proportion. Consequently, to each value of the running speed or of the frequency there corresponds a quite definite adjustment of the braking resistor. The necessity of readjusting the setting of the braking resistor can be avoided if during braking the voltage is not forced to increase proportionally to the running speed or to the frequency, but for instance, proportionally to the root of the frequency. For in the latter case the motors will operate to some extent in the same manner as series motors in so far as at the lower speeds the motor fluxes will be stronger than at the higher speeds. The ratio of voltage to current will then remain constant—regardless of the magnitude of the braking force—not only at one given speed step, but at all speed steps. In other words, the braking resistor need not be readjusted in this case.

It may be advantageous in certain instances to arrange the equipment of ordinary trains composed of motor coaches that can draw electric power from a trolley wire in such a manner that on track sections not equipped with a trolley wire, a locomotive constructed in line with this invention can be coupled with the train so that the energy required for operating the traction motors can be generated by means of a thermally operated prime mover installed on said locomotive.

We claim as our invention:

1. In a power-transmission system for electrically driven trains, in combination, a locomotive equipped with a thermally operating prime mover, induction generators driven by the prime mover, and traction motors supplied with current from said generators, said generators having different pole numbers to supply current at frequencies corresponding to their pole numbers when connected individually to said motors.

2. In a power-transmission system for electrically driven trains, in combination, a locomotive equipped with a thermally operating prime mover, induction generators driven by the prime mover, and traction motors supplied with current from said generators, said generators having different pole numbers to supply current at frequencies corresponding to their pole numbers when connected individually to said motors, and means for connecting the generators in cascade relation to supply current at frequencies equal to the sum and to the difference of the frequencies corresponding to their pole numbers.

3. In a power-transmission system for electrically driven trains, in combination, a locomotive equipped with a thermally operating prime mover, induction generators driven by the prime mover, traction motors supplied with current from said generators, said generators having different pole numbers to supply current at frequencies corresponding to their pole numbers when connected individually to said motors, means for connecting the generators in cascade relation to supply current at frequencies equal to the sum and to the difference of the frequencies corresponding to their pole numbers, and means for controlling said generators while they are operating individually or in cascade by slip regulation.

4. In a power-transmission system for electrically driven trains, in combination, a locomotive equipped with a thermally operating prime mover, induction generators driven by the prime mover, traction motors supplied with current from said generators, said generators having different pole numbers to supply current at frequencies corresponding to their pole numbers when connected individually to said motors, means for connecting the generators in cascade relation to supply current at frequencies equal to the sum and to the difference of the frequencies corresponding to their pole numbers, said generators having polyphase slip ring rotors, and slip regulating resistances for controlling said generators.

5. In a power-transmission system for electrically driven trains, in combination, a locomotive equipped with a prime mover, alternating current generators driven by the prime mover, traction motors supplied with current from said generators, said generators having different pole numbers to supply current at frequencies corresponding to their pole numbers when connected individually to said motors, means for connecting the generators in cascade relation to supply current at frequencies equal to the sum and to the difference of the frequencies corresponding to their pole number, and means for supplying exciting current for said generators.

6. In a power-transmission system for electrically driven trains, in combination, a locomotive equipped with a prime mover, alternating current generators driven by the prime mover, traction motors supplied with current from said generators, said generators having different pole numbers to supply current at frequencies corresponding to their pole numbers when connected individually to said motors, means for connecting the generators in cascade relation to supply current at frequencies equal to the sum and to the difference of the frequencies corresponding to their pole numbers, a synchronous generator for supplying exciting current for said alternating current generators, and variable speed means for driving said synchronous generator.

WOLFGANG STEINBAUER.
HANS KOTHER.
PAUL MÜLLER.